United States Patent [19]

Miyake

[11] Patent Number: 5,232,529

[45] Date of Patent: Aug. 3, 1993

[54] METHOD FOR JOINING NON-WOVEN FABRICS

[75] Inventor: Takao Miyake, Shizuoka, Japan

[73] Assignee: San-M Package Co., Ltd., Shizuoka, Japan

[21] Appl. No.: 803,416

[22] Filed: Dec. 6, 1991

[30] Foreign Application Priority Data

Sep. 12, 1991 [JP] Japan .................. 3-261194

[51] Int. Cl.⁵ ........................................ B32B 31/16
[52] U.S. Cl. ............................ 156/73.4; 156/73.1; 156/157; 156/304.1; 156/312; 264/23
[58] Field of Search ............... 156/73.1, 73.4, 157, 156/304.1, 304.3, 304.4, 304.5, 304.6, 159, 203, 215, 217, 218, 466, 163, 312; 264/23

[56] References Cited

U.S. PATENT DOCUMENTS

| | | | |
|---|---|---|---|
| 3,661,669 | 5/1972 | Cairns | 156/157 |
| 3,796,625 | 3/1974 | Rutledge | 156/159 X |
| 4,177,100 | 12/1979 | Pennington | 156/157 |
| 4,461,662 | 7/1984 | Onishi | 156/73.4 |
| 4,605,578 | 8/1986 | Emrich et al. | 428/57 |
| 4,670,073 | 6/1987 | Langley | 156/73.1 |
| 4,938,817 | 7/1990 | Langley | 156/73.1 |

*Primary Examiner*—David A. Simmons
*Assistant Examiner*—J. Sells
*Attorney, Agent, or Firm*—Sughrue, Mion, Zinn, Macpeak & Seas

[57] ABSTRACT

A method for joining non-woven fabrics having the following steps; opposing the same sides of a first and a second non-woven fabrics and, whereby superimposing end portions thereof, joining with heat bonding the end portions superimposed, opening the first and second non-woven fabrics at both sides of a fabric to the first and second non-woven fabrics in the opening state, while extending over them along the joining portion, and joining with heat bonding the third non-woven fabric to the first and second non-woven fabrics including the joining portion.

3 Claims, 6 Drawing Sheets

METHOD FOR JOINING NON-WOVEN FABRICS

BACKGROUND OF THE INVENTION

1. Field of the Invention

The present invention relates to a method for joining non-woven fabrics. More particularly, it relates to a method for joining, via heat bonding, non-woven fabrics used for dust-proof working wear, etc.

2. Description of the Related Art

Generally, it is well known that non-woven fabrics have the characteristics of airtightness. Making the best use of this airtightness, non-woven fabrics have been utilized for a dust-proof or surgical working wear, etc.

It is well known that, when working wear is made by non-woven fabrics of such characteristics, they have been joined to each other with sewing thread. However, when the above joining method for joining non-woven fabrics is used, many holes are made in them owing to sewing thread. Consequently, since airtightness is lost, it is impossible to make the best use of the characteristics of non-woven fabrics by sewing them together.

A method as shown in FIG. 1A has been provided, according to which method non-woven fabrics may be joined to each other without sewing thread. In the method as shown in FIG. 1A, the end portions 100A and 100B of two non-woven fabrics 100 and 200 are made to be opposed and superimposed. The superimposed portions are bonded with heat while the width W thereof is kept constant.

Taking this means of heat bonding as an example, there is also known super-sonic wave welding as well.

Sewing thread is not used in the method as shown in FIG. 1A. Hence, the airtightness of non-woven fabric can be maximally utilized.

However, the problems of the above conventional method are as follows, regarding the manufacturing efficiency of the method and the joining strength of the product manufactured by the method.

First, the manufacturing efficiency is low.

In the conventional method as shown in FIG. 1A, the end portions 100A and 200A of two non-woven fabrics 100 and 200 are bonded with heat, by means of superimposing them by width W. However, it is very difficult to keep the width W fixed throughout all the processes. For example, though the size of the width W must be originally kept constant from the first position 1 to the final position 2 as shown in FIG. 1B, there are instances where the non-woven fabric 200 becomes askew with the non-woven fabric 100 during the processes, and accordingly, the size of the width W is not kept fixed. In this case, since the method must be restarted, all the processes until then go to waste. Hence, the conventional method has the problem that the manufacturing efficiency thereof is low.

Another deficiency of the conventional method is that the joining strength of the product is small. In the conventional method as shown in FIG. 1A, in side view, the joining place of the non-woven fabrics 100 and 200 is only at one place a. Accordingly, there is the problem that the joining strength against forces f1 and f2 in the transverse direction is weak, as shown in FIG. 1A. Hence, the non-woven fabrics 100 and 200, which are joined each other, are easily torn apart by the operation of the above forces f1 and f2. Consequently, the airtightness of non-woven fabrics is lost or difficult to maintain.

SUMMARY OF THE INVENTION

An object of the present invention is to increase the manufacturing efficiency of the method for joining non-woven fabrics and to increase the joining strength of the product manufactured by the same method.

The above-mentioned object can be achieved by a method for joining non-woven fabrics, comprising the steps of opposing the same sides of a first and a second non-woven fabrics 1 and 2, whereby superimposing end portions 1A and 2A thereof, joining with heat bonding said end portions 1A and 2A superimposed, opening said first and second non-woven fabrics 1 and 2 at both sides of a joining portion S of said end portions 1A and 2A, applying a third non-woven fabric 3 to said first and second non-woven fabrics 1 and 2 in the opened state, while extending over them along said joining portion S, and joining with heat bonding said third non-woven fabric 3 to said first and second non-woven fabrics 1 and 2 including said joining portion S.

BRIEF DESCRIPTION OF THE DRAWINGS

Further features and advantages of the present invention will be apparent from the ensuing description with reference to the accompanying drawings, wherein.

DESCRIPTION OF THE PREFERRED EMBODIMENTS

Figure 1A:
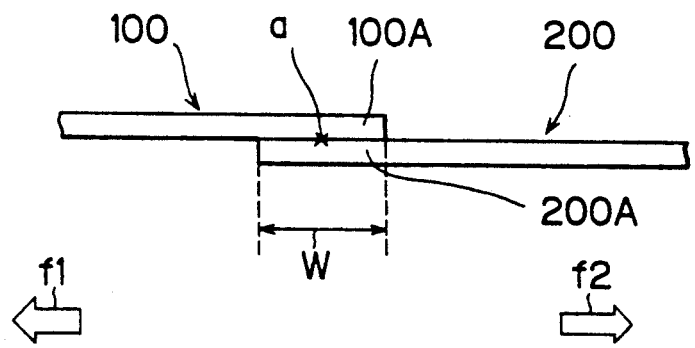
FIGS. 1A and 1B are explanatory drawings of the prior art.
Figure 1B:
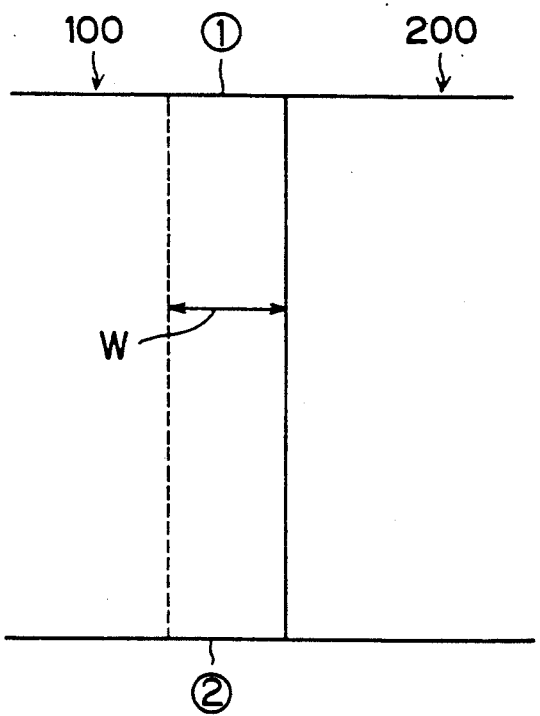

FIGS. 2A to 2E are drawings of an embodiment of the present invention, wherein reference numeral 1 shows a first non-woven fabric; 2, a second non-woven fabric; 3, a third non-woven fabric; 1A, the end portion of the first non-woven fabric 1; 2A, the end portion of the second non-woven fabric 2; and S, a joining portion of the first and the second non-woven fabrics 1 and 2.

The present invention will be explained hereinafter.

Figure 2A:
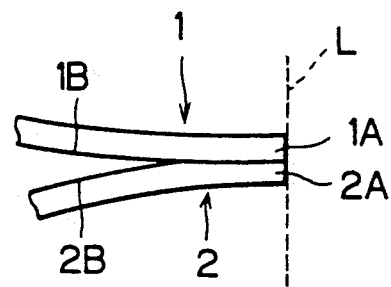
FIGS. 2A to 2E are drawings of an embodiment of the present invention.

First, the same sides of the first and second non-woven fabrics I and 2 are placed opposite each other, and end portions 1A and 2A are superimposed thereof. As shown in FIG. 2A, same sides 1B and 2B of first and second non-woven fabrics 1 and 2 are placed opposite each other. Thereafter, the end portions 1A and 2A of the first and second non-woven fabrics 1 and 2 are superimposed by arranging the head portions L thereof.

Next, the superimposed end portions 1A and 2A are joined with heat bonding.

Figure 3:
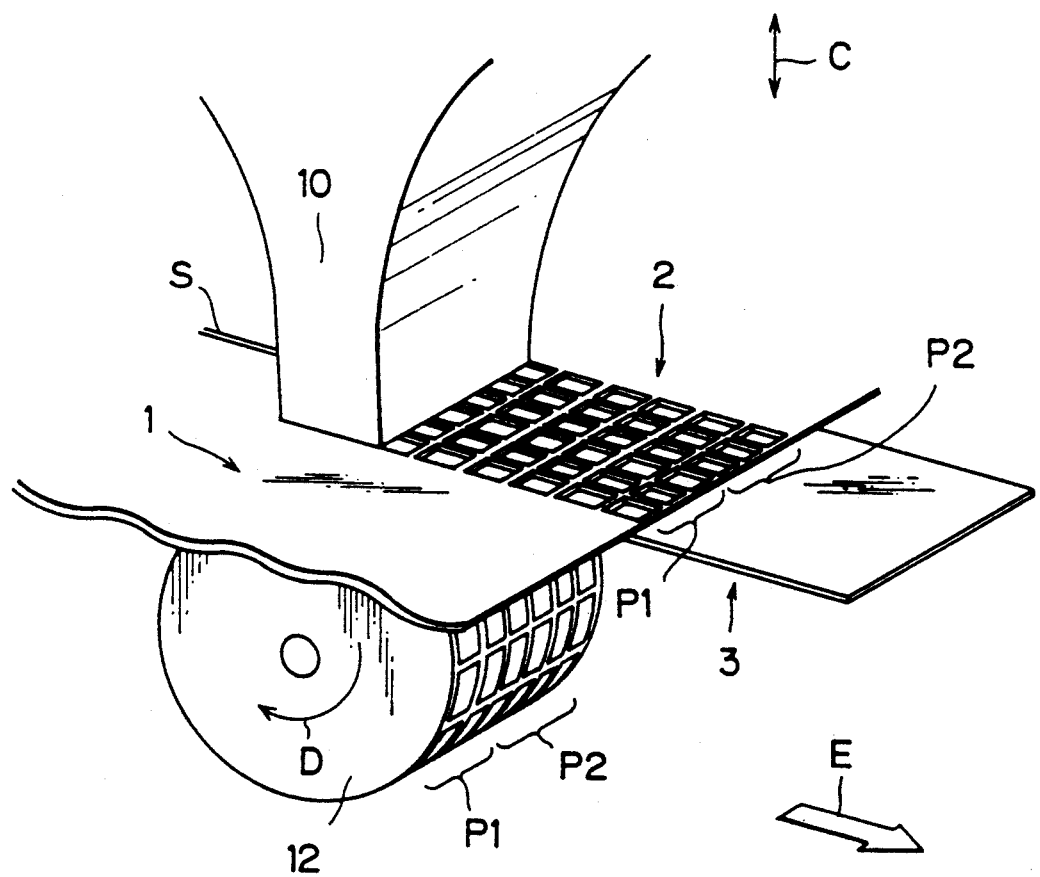
FIG. 3 is a drawing of an example of an apparatus for carrying out the present invention.

Taking the means of heat bonding as an example, there is an apparatus for joining non-woven fabrics as shown in FIG. 3, said apparatus taking advantage of super-sonic waves.

Figure 2B:
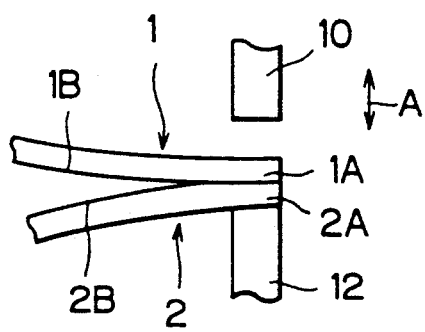

As shown in FIG. 2B, after superimposed end portions 1A and 2A are placed on anvil 12, super-sonic wave vibration is applied to them in the vertical direction as shown by arrow A, with horn 10 under constant pressure.

Accordingly, end portions 1A and 2A may be joined with heat bonding.

First and second non-woven fabrics 1 and 2 are then opened at joining portion S of end portions 1A and 2A. That is to say, as shown in FIG. 2C, with the joining portion S as the central point, first and second non-woven fabrics 1 and 2 are opened. In this case, joining portion S projects slightly upwards, as shown in FIG. 2C.

Figure 2D:
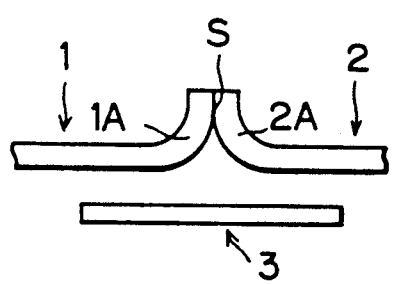
Figure 2C:
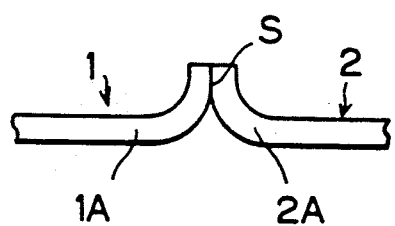

Next, as shown in FIG. 2D, third non-woven fabric 3 is applied, extending over first and second non-woven fabrics 1 and 2 in the open state along the longitudinal direction of joining portion S with joining portion S as the central point. This third non-woven fabric 3 may be made from the same material as first and second non-woven fabrics 1 and 2. However, it is preferable that it is thinner than first and second non-woven fabrics 1 and 2 in order to increase the flexibility of the seam formed by end portions 1A and 2A and joining portion S.

Finally, third non-woven fabric 3 is made to join, via heat bonding, to the first and second non-woven fabrics 1 and 2 including the joining portion S.

Figure 2E:
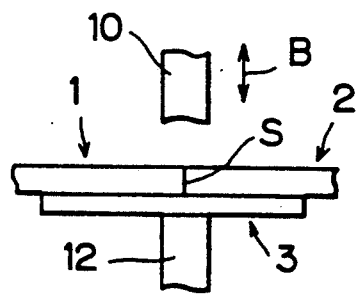

As shown in FIG. 2E, first and second non-woven fabrics 1 and 2, with third non-woven fabric 3 applied thereto, are placed on anvil 12. From above fabrics 1 and 2, super-sonic wave vibration is applied in the vertical direction, as shown by arrow B, with horn 10 under constant pressure. Thereby, not only are non-woven fabrics 1 and 2 directly joined as shown in FIG. 2B, but they are also joined with third non-woven fabric 3 as shown in FIG. 2E.

Figure 6A:
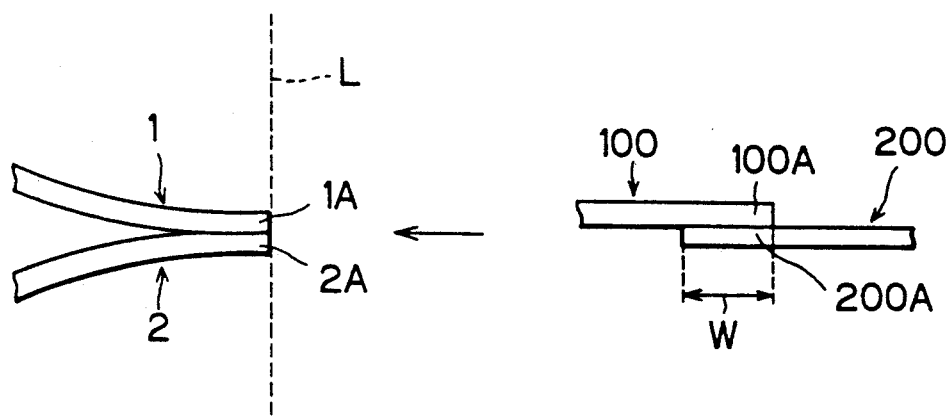
FIGS. 6A and 6B are explanatory drawings of the effects of the present invention.
Figure 6B:
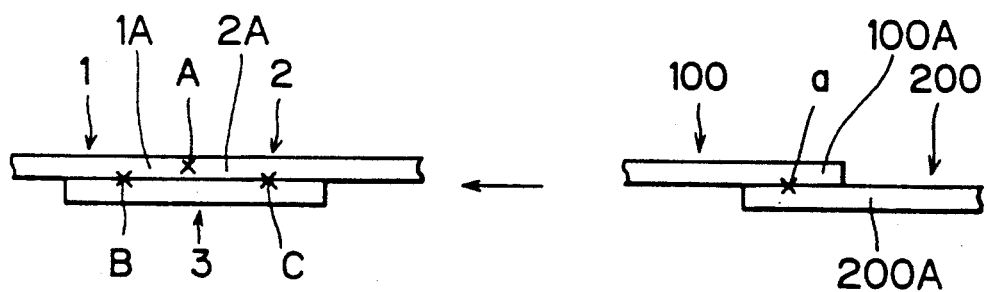

Accordingly, as compared to the prior art, under the present invention, the manufacturing efficiency of the method for joining non-woven fabrics has been increased, as shown in FIG. 6A, and the joining strength of the product manufactured by the same method has been increased, as shown in FIG. 6B. That is to say, in the prior art, as shown in the right drawing of FIG. 6A, it is difficult to keep width W, the superimposed portion of end portions 100A and 200A of non-woven fabrics 100 and 200, constant throughout all the processes. Hence, the manufacturing efficiency is low.

However, according to the present invention, as shown in the left drawing of FIG. 6A, the end portions 1A and 2A may be joined when the head portions L thereof are arranged properly.

Thus, the manufacturing efficiency has been increased.

Furthermore, in the prior art, as shown in the right drawing of FIG. 6B, end portions 100A and 200A are joined at only one place a. Hence, the joining strength of the product manufactured is small.

However, according to the present invention, as shown in the left drawing of FIG. 6B, end portions 1A and 2A may be joined at three places, A, B and C, with the use of third non-woven fabric 3. Accordingly, the joining strength of the product manufactured has been increased.

FIG. 3 shows an example of an apparatus for carrying out the method in accordance with the present invention, said apparatus being one for joining non-woven fabrics with super-sonic wave bonding. In FIG. 3, reference numeral 10 is a horn, 12 is an anvil. As is well known, horn 10 is a vibrator which is vibrated by super-sonic waves, and anvil 12 is a pedestal on which an object, to be bonded with heat by using the above super-sonic waves, is placed. The horn 10 is vibrated in the vertical direction, as shown with arrow C, by a super-sonic wave oscillator at the desired frequency. Anvil 12 may be rotatable in the clockwise direction, as shown with arrow D. Patterns P1 and P2 are formed on the outer surface of anvil 12. That is to say, the anvil 12 is a knurled anvil. By replacing anvil 12, it is possible to form via heat bonding the joining area with patterns of different design.

Generally, after an object is inserted between horn 10 and anvil 12, super-sonic wave vibration in the vertical direction is applied by horn 10 to the object under constant pressure, whereby heat bonding is carried out owing to the generation of heat. Consequently, patterns P1 and P2 formed on anvil 12 appear on the object.

The above general explanation will be hereinafter described in detail based on an example, as shown in FIG. 3.

In FIG. 3, an object is inserted between horn 10 and anvil 12. The object is composed of first and second non-woven fabrics 1 and 2 in the open state with the joining portion S as the central figure, and third non-woven fabric 3 applied along the longitudinal direction of joining portion S, extending over non-woven fabrics 1 and 2.

At first, first and second non-woven fabrics 1 and 2 are placed on anvil 12 with third non-woven fabric 3 applied to them along the longitudinal direction of joining portion S. Next, super-sonic wave vibration in the vertical direction C is applied by horn 10 to the object under constant pressure, whereby heat bonding is carried out owing to the generation of heat. Meanwhile, the anvil 12 rotates in the direction as shown by arrow D, and accordingly the above object inserted between horn 10 and anvil 12 is carried in the direction as shown with arrow E.

Consequently, as shown in FIG. 3, patterns P1 and P2 are formed on first and second non-woven fabrics 1 and 2 with joining portion S as the central figure, said patterns being the same as patterns P1 and P2 of anvil 12.

Figure 4A:
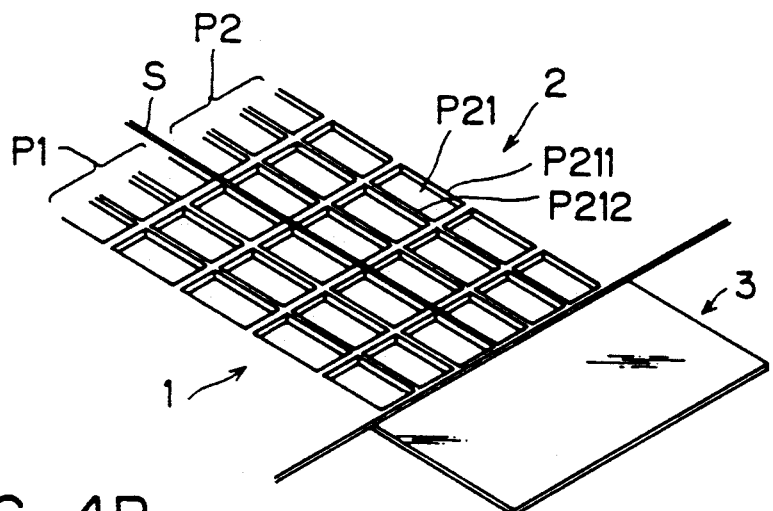
FIGS. 4A to 4C are drawings of patterns formed in the joined area by the method in accordance with the present invention.
Figure 4B:
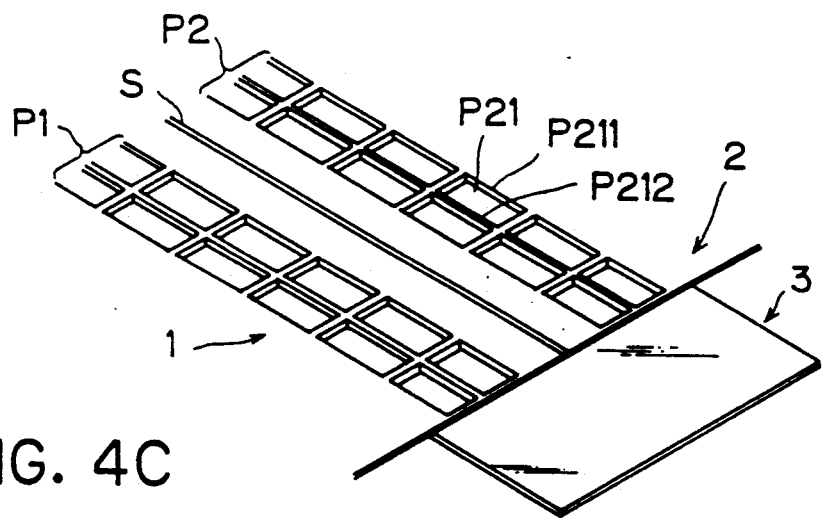
Figure 4C:
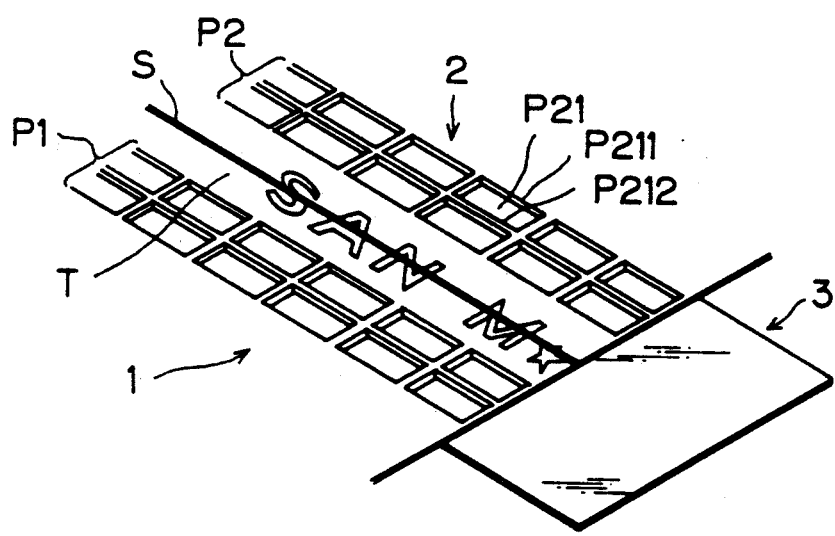

FIG. 4A to 4C are drawings of patterns formed in the joined area by the method in accordance with the present invention. FIG. 4A shows patterns P1 and P2 formed continuously to the left and right of joining portion S of first and second non-woven fabrics 1 and 2.

The detail of patterns P1 and P2 is as follows, referring, for example, to the patterns P2. The patterns P2 consist of a concave portion P12 and convex portions P211 and P212 at both sides of the concave portion P12. The concave portion P12 is thinner than the other portions and is formed in film, whereby the joined area has flexibility.

In FIG. 4B, patterns P1 and P2 are formed a short distance away from joining portion S.

FIG. 4C shows an application of FIG. 4B, wherein a different pattern T is formed between patterns P1 and P2. The pattern T may be the trademark of a maker as shown in FIG. 4C. Alternatively, the pattern T may be another beautiful design.

As above-mentioned, these patterns may be easily formed by replacing anvil 12

Figure 5:
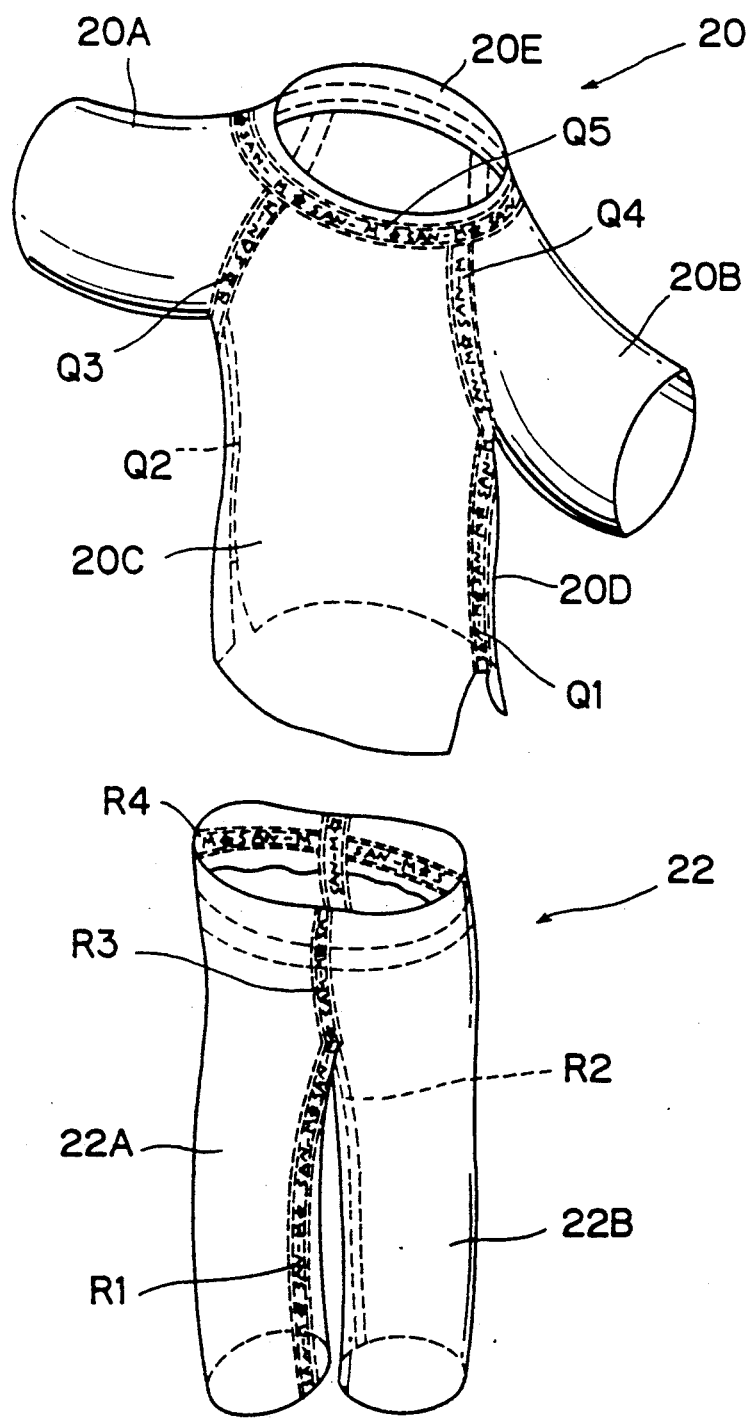
FIG. 5 is a drawing of an application of the present invention.

FIG. 5 is an application of the present invention, wherein a surgical working wear is shown as an example. The surgical working wear is divided into an upper garment 20 and a pair of trousers 22 formed respectively by non-woven fabric.

The upper garment 20 is constituted by right arm portion 20A, left arm portion 20B, front body 20C, a back body 20D, and collar portion 20E.

According to the method of the present invention, as shown in FIGS. 2A to 2E, regarding the seams formed by front body 20C and back body 2D, right arm portion 20A and front body 20C and back body 20D, left arm portion 20B and front body 20C and back body 20D, and collar portion 20E and front body 20C and back body 20D, the end portions are bonded with heat directly as well as by using a third non-woven fabric. Thereby, patterns Q1, Q2, Q3, Q4 and Q5 are formed, corresponding to the patterns as shown in FIG. 4C.

The trousers 22 are constituted by right leg portion 22A and left leg portion 22B.

According to the method of the present invention as shown in FIGS. 2A to 2E, regarding the seams formed by right leg portion 22A and left leg portion 22B, and a turned waist, the end portions are bonded with heat directly as well as by using a third non-woven fabric. Thereby, patterns R1, R2, R3 and R4 are formed, corresponding to the patterns as shown in FIG. 4C.

As above-mentioned, according to the present invention, as shown in FIGS. 2C to 2E, there is provided a method for joining non-woven fabrics, comprising the steps of opposing the same sides of first and second non-woven fabrics 1 and 2, whereby superimposing end portions 1A and 2A thereof, joining via heat bonding said superimposed end portions 1A and 2A, opening said first and second non-woven fabrics 1 and 2 at both sides of joining portion S of said end portions 1A and 2A, applying third non-woven fabric 3 to said first and second non-woven fabrics 1 and 2 in the open state, while extending over them along said joining portion S, and joining with heat bonding said third non-woven fabric 3 to said first and second non-woven fabrics 1 and 2 including said joining portion S.

According to the above specification, the same sides of fabrics 1 and 2 are placed in opposition, and portions 1A and 2A thereof are superimposed (see FIG. 2A), whereby superimposed end portions 1A and 2A are joined with heat bonding (see FIG. 2B).

Hence, compared with the difficulty involved in keeping width W constant in all the processes (see the right drawing of FIG. 6A) in the conventional method, it is very easy to bond end portions 1A and 2A with heat by superimposing them, that is to say, by properly arranging the head portions L thereof (see the left drawing of FIG. 6A). Thus, the manufacturing efficiency of the method for joining non-woven fabrics according to the present invention is greater than that of the prior art.

According to the above specification, fabrics 1 and 2 are opened at both sides of joining portion S of end portions 1A and 2A (see FIG. 2C), third fabric 3 is applied to fabrics 1 and 2 in the open state, while extending over them along joining portion S (see FIG. 2D), and third fabric 3 is joined with heat bonding to fabrics 1 and 2 including joining portion S (see FIG. 2E). Thus, the fabrics are conventionally joined at only one point a (see the right drawing of FIG. 6B) and are joined according to the present invention at points A, B and C (see the left drawing of FIG. 6B).

Accordingly, the joining strength of the product manufactured by the present invention is greater than that of the prior art.

I claim:

1. A method for joining two non-woven fabrics with a third non-woven fabric via heat bonding in order to form an airtight seam, using a heat bonding apparatus including an anvil (12) with patterns formed upon its outer surface, said process comprising the steps of:

placing first and second non-woven fabrics (1) and (2) one on top of the other, so that respective end portions (1A) and (2A) are superimposed;

joining with heat bonding said superimposed end portions (1A) and (2A);

opening said first and second non-woven fabrics (1) and (2) at both sides of a joining portion (S) of said end portions (1A) and (2A);

applying a third non-woven fabric (3) to said first and second non-woven fabrics (1) and (2) in the open state, extending it over them longitudinally along said joining portion (S);

placing said first, second, and third non-woven fabrics (1), (2), and (3) upon said anvil (12); and joining with heat bonding said third non-woven fabric (3) to said first and second non-woven fabrics (1) and (2) including said joining portion (S), thereby forming said patterns found upon said anvil (12) on said first, second and third non-woven fabrics (1), (2), and (3) either adjacent to or some distance away from said joining portion (S).

2. A method for joining non-woven fabrics according to claim 1, wherein said heat bonding is carried out by using super-sonic waves.

3. A process as claimed in claim 1, wherein the step of forming said patterns found upon anvil (12) on said first, second, and third non-woven fabrics (1), (2), and (3) includes rotating said anvil (12) about an axis, thereby advancing first, second, and third non-woven fabrics (1), (2), and (3) for further joining.

* * * * *